(12) United States Patent
Dettinger et al.

(10) Patent No.: US 7,865,845 B2
(45) Date of Patent: Jan. 4, 2011

(54) CHAINING OBJECTS IN A POINTER DRAG PATH

(75) Inventors: Richard Dean Dettinger, Rochester, MN (US); Daniel Paul Kolz, Rochester, MN (US); Shannon Everett Wenzel, Colby, WI (US)

(73) Assignee: International Business Machines Corporation, Armonk, NY (US)

(*) Notice: Subject to any disclaimer, the term of this patent is extended or adjusted under 35 U.S.C. 154(b) by 259 days.

(21) Appl. No.: 12/132,272

(22) Filed: Jun. 3, 2008

(65) Prior Publication Data

US 2008/0235610 A1 Sep. 25, 2008

Related U.S. Application Data

(63) Continuation of application No. 11/012,908, filed on Dec. 15, 2004, now abandoned.

(51) Int. Cl.
*G06F 3/033* (2006.01)
*G06F 3/00* (2006.01)

(52) U.S. Cl. .................. 715/863; 715/702; 715/856; 715/861; 715/866

(58) Field of Classification Search ............. 715/769, 715/856, 861, 863; 345/156–158
See application file for complete search history.

(56) References Cited

U.S. PATENT DOCUMENTS

| 4,772,882 | A | 9/1988 | Mical |
| 5,608,860 | A | 3/1997 | Fitzpatrick et al. |
| 5,638,505 | A | 6/1997 | Hemenway et al. |
| 5,801,699 | A * | 9/1998 | Hocker et al. ............... 715/837 |
| 6,191,807 | B1 | 2/2001 | Hamada et al. |
| 6,570,597 | B1 * | 5/2003 | Seki et al. .................... 715/835 |
| 6,639,612 | B2 | 10/2003 | Bosma et al. |
| 6,976,224 | B2 * | 12/2005 | Nii ............................. 715/769 |
| 7,454,717 | B2 * | 11/2008 | Hinckley et al. ............ 715/863 |
| 7,770,125 | B1 * | 8/2010 | Young et al. ................ 715/764 |
| 2003/0222915 | A1 | 12/2003 | Marion et al. |
| 2004/0004638 | A1 | 1/2004 | Babaria |
| 2005/0060653 | A1 | 3/2005 | Fukase et al. |
| 2007/0016872 | A1 * | 1/2007 | Cummins et al. ........... 715/769 |
| 2007/0157097 | A1 * | 7/2007 | Peters ........................ 715/764 |

* cited by examiner

*Primary Examiner*—Steven B Theriault
(74) *Attorney, Agent, or Firm*—Martin & Associates, LLC; Derek P. Martin

(57) ABSTRACT

An apparatus and method for a graphical user interface allow performing operations simply by dragging a first object to touch a second object. The selection of the first object places a corresponding first object in a chain of objects. When the selected first object touches a second object, a corresponding second object is added to the chain of objects. This process may continue for the selection of many objects by merely touching each object with the selected first object, which causes a corresponding object to be added to the chain of objects. The chain of objects may then be processed as an atomic group of operations that may be rolled back if any of the operations in the group fail.

20 Claims, 8 Drawing Sheets

Chaining Rules:
1. Compress, Encrypt or Delete objects may be chained to dragged file object
2. Location object may be chained to dragged file object
3. Location object may be chained to Compress, Encrypt or Delete objects
FIG. 5
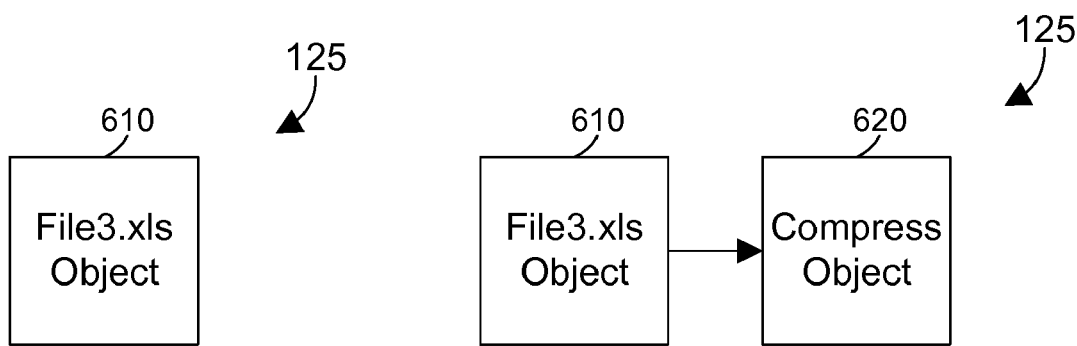
FIG. 6          FIG. 7
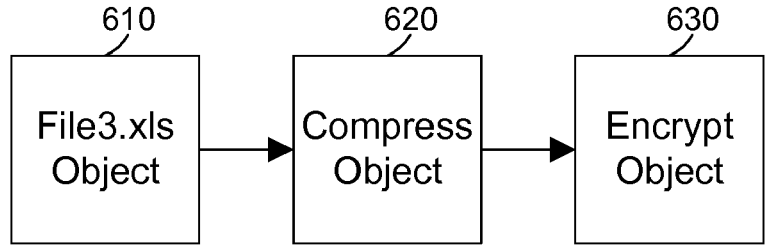
FIG. 8
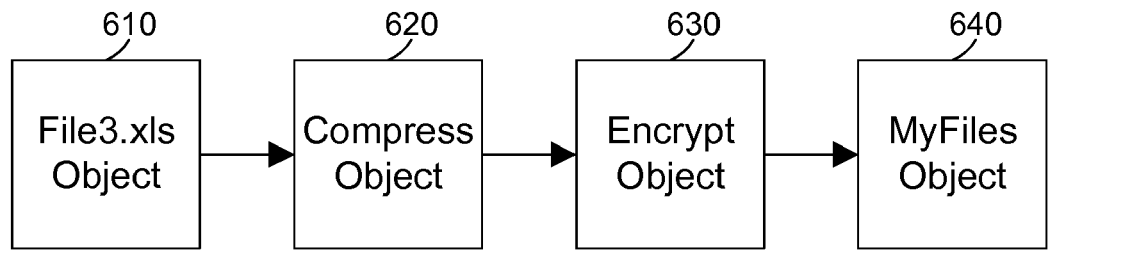
FIG. 9

Compress and Encrypt file3.xls and move the compressed, encyrpted file3.xls to the MyFiles directory Chaining Rules:
A. Select Workflow step first
B. Apply rules to last selected workflow step
C. Drag path that goes from rule to workflow step ends previous workflow step and begins new workflow step

CHAINING OBJECTS IN A POINTER DRAG PATH

CROSS-REFERENCE TO PARENT APPLICATION

This patent application is a continuation of U.S. Ser. No. 11/012,908 filed on Dec. 15, 2004, which is incorporated herein by reference.

BACKGROUND OF THE INVENTION

1. Technical Field

This invention generally relates to computer systems and more specifically relates to graphical user interfaces for computer systems.

2. Background Art

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple McIntosh. Software applications with graphical user interfaces soon followed, and the vast majority of computer programs running on personal computers today include a user-friendly graphical user interface.

Most graphical user interfaces provide many similar features. The basic display area in a graphical user interface is known as a window. A single window may fill the entire display, or the display can be split into a number of different windows. Most graphical user interfaces provide a menu bar that provides several drop-down lists of commands the user can perform. Various toolbars may also be provided that are customized to performing certain tasks within the computer program. A pointing device such as a trackball or a mouse is generally used to select various commands and options by clicking on the appropriate buttons on the menu bar, tool bar, or by selecting particular objects or portions of a window. Many operations in known graphical user interfaces may be performed by selecting an object by pressing a pointer button, holding the pointer button down while moving the object to a desired location, and dropping the object at the desired location by releasing the pointer button. The moving of an object while holding a pointer button down (i.e., while the object is selected) is commonly referred to as "dragging" the object. For example, a user can delete a file by selecting a file icon by pressing a pointer button, dragging the file icon to a recycle bin icon or a trash can icon, then releasing the pointer button to drop the file icon onto the recycle bin or trash can. A user can move a file by selecting a file icon and dragging the file icon to a new directory, then releasing the pointer button to drop the file icon onto the new directory. Both of these example relates to moving a file, but do not allow performing operations on the file without moving the file. These and other operations that allows a user to drag an object in a graphical user interface are known in the art.

While using a pointer is a very convenient way to navigate a graphical user interface, the user still must make multiple pointer clicks to perform most operations in ways that are often not intuitive or easy to perform. For example, if the user desires to combine two logical expressions A and B with a logical operator AND, the user could select the first logical expression A with a pointer click, select the second logical expression B with a pointer click, then click on an AND button to logically AND these two logical expressions together. This sequence of operations is different than the way a human user looks at the logical expression A AND B. As a result, a user's efficiency may be negatively affected by the current user interfaces known in the art. Without a mechanism that simplifies the use of a graphical user interface, users will have to continue using outdated graphical user interfaces that require an excessive number of pointer clicks to accomplish a desired task and that do not support performing computer tasks in a quick and intuitive fashion.

DISCLOSURE OF INVENTION

According to the preferred embodiments, an apparatus and method for a graphical user interface allow performing operations simply by dragging a first object to touch a second object. The selection of the first object places a corresponding first object in a chain of objects. When the selected first object touches a second object, a corresponding second object is added to the chain of objects. This process may continue for the selection of many objects by merely touching these objects with the selected first object. The addition of objects to the chain is performed according to predefined rules. The chain of objects may then be processed as an atomic group of operations that may be rolled back if any of the operations in the group fail. The processing of objects in the chain is also performed according to predefined rules. In this manner, the number of pointer clicks to implement a particular function may be reduced and operations may be performed in a more intuitive manner, thereby enhancing the efficiency of the user. The preferred embodiments thus provide a way to perform functions in a graphical user interface in a way that is faster, more intuitive, and uses fewer pointer clicks than is possible in the prior art.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a table of rules that govern the function of a pointer drag path chaining mechanism for a first example in accordance with the preferred embodiments;

FIG. 6 is a diagram of a chain of objects in accordance with the preferred embodiments immediately after selecting the file3.xls object in FIG. 4;

FIG. 7 is a diagram of the chain of objects in FIG. 6 after the pointer in FIG. 4 touches the Compress button 420;

FIG. 8 is a diagram of the chain of objects in FIG. 7 after the pointer in FIG. 4 touches the Encrypt button 430;

FIG. 9 is a diagram of the chain of objects in FIG. 7 after the pointer in FIG. 4 touches the MyFiles object 440;

BEST MODE FOR CARRYING OUT THE INVENTION

The preferred embodiments provide pointer drag path chaining operations that enhance the power of a graphical user interface by chaining together a chain of objects that correspond to a selected object and to objects that are touched while dragging the selected object. The chain of objects may then be processed as an atomic group of operations that may be rolled back if any of the operations in the group fail. The addition of objects to the chain and the processing of objects in the chain are done according to predefined rules. In this manner, the number of pointer clicks to implement a particular function may be reduced and operations may be performed in a more intuitive manner, thereby enhancing the efficiency of the user.

Figure 1:
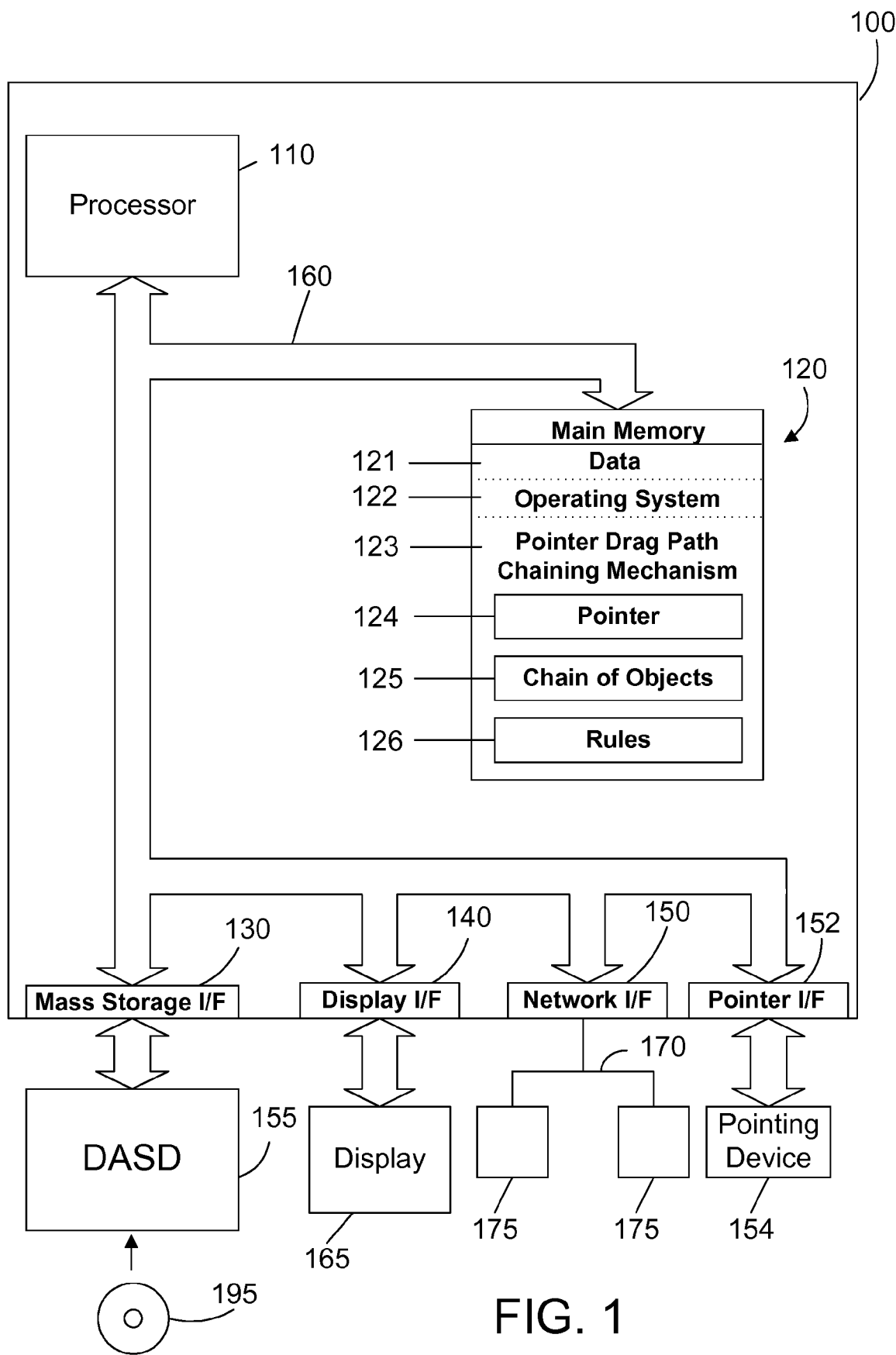
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and methods of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, a network interface 150, and a pointer interface 152. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, and a pointer drag path chaining mechanism 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Pointer drag path chaining mechanism 123 provides enhanced functionality for the operating system 122 and for applications running on the computer system 100 by allowing the chaining together of objects that correspond to objects in a GUI so the objects may be processed as an atomic group of operations instead of being processed one at a time. This process of chaining objects allows a user interface that is more intuitive and easier to use (and hence more efficient) than known graphical user interfaces. An object is first selected using a pointer 124 that is generated and controlled by a suitable pointing device 154 (e.g., mouse or trackball) coupled to the pointer interface 152. An object corresponding to the selected first object is then added to a chain of objects 125 that represents a set of operators and operands that will be processed all at once when a defined event occurs, such as a pointer drop of an object. While the object is selected, the selected object may be dragged to touch one or more other objects, which results in one or more corresponding objects being added to the chain of objects 125. Note that an object will not be necessarily added to the chain of objects 125 each time an object in the GUI is touched by the selected object. Whether or not the pointer drag path chaining mechanism 123 will add an object to the chain of objects 125 when the selected object touches a different object may be determined using predefined rules 126. Once the pointer 124 deselects the first object, all of the operations represented in the chain of objects 125 will be processed according to predefined rules 126. In the preferred embodiments, the operations represented in the chain of objects 125 are performed as an atomic group of operations. By treating the chained operations as an atomic group of operations, all of the operations in the group may be rolled back in the event that any operation in the group fails. The function of the pointer drag path chaining mechanism 123 is shown in more detail below with reference to FIGS. 2-20.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122 and pointer drag path chaining mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, pointer interface 152, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Pointer interface 152 is used to connect a pointing device 154 (such as a mouse or trackball) to computer system 100. A user may use the pointing device 154 to select an object in a graphical user interface. Once an object is selected, it may be dragged by moving the object while selected to change the object's location in the graphical user interface. While the mouse is the most commonly-used pointing device in use today, the preferred embodiments expressly extend to any and all pointing devices, whether currently known or developed in the future.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

In the discussion that follows, the term "click" and "clicking" is used to denote pressing a button on a pointing device (such as a mouse or a trackball), which is one specific example of a way to perform a pointer selection of a GUI object within the scope of the preferred embodiments. The preferred embodiments expressly extend to any type of pointing device and any type of mechanism for selecting an object in a graphical user interface, including switch closures, optical detectors, voice commands, or any other way for selecting an object in a GUI, whether now known or developed in the future.

Figure 2:
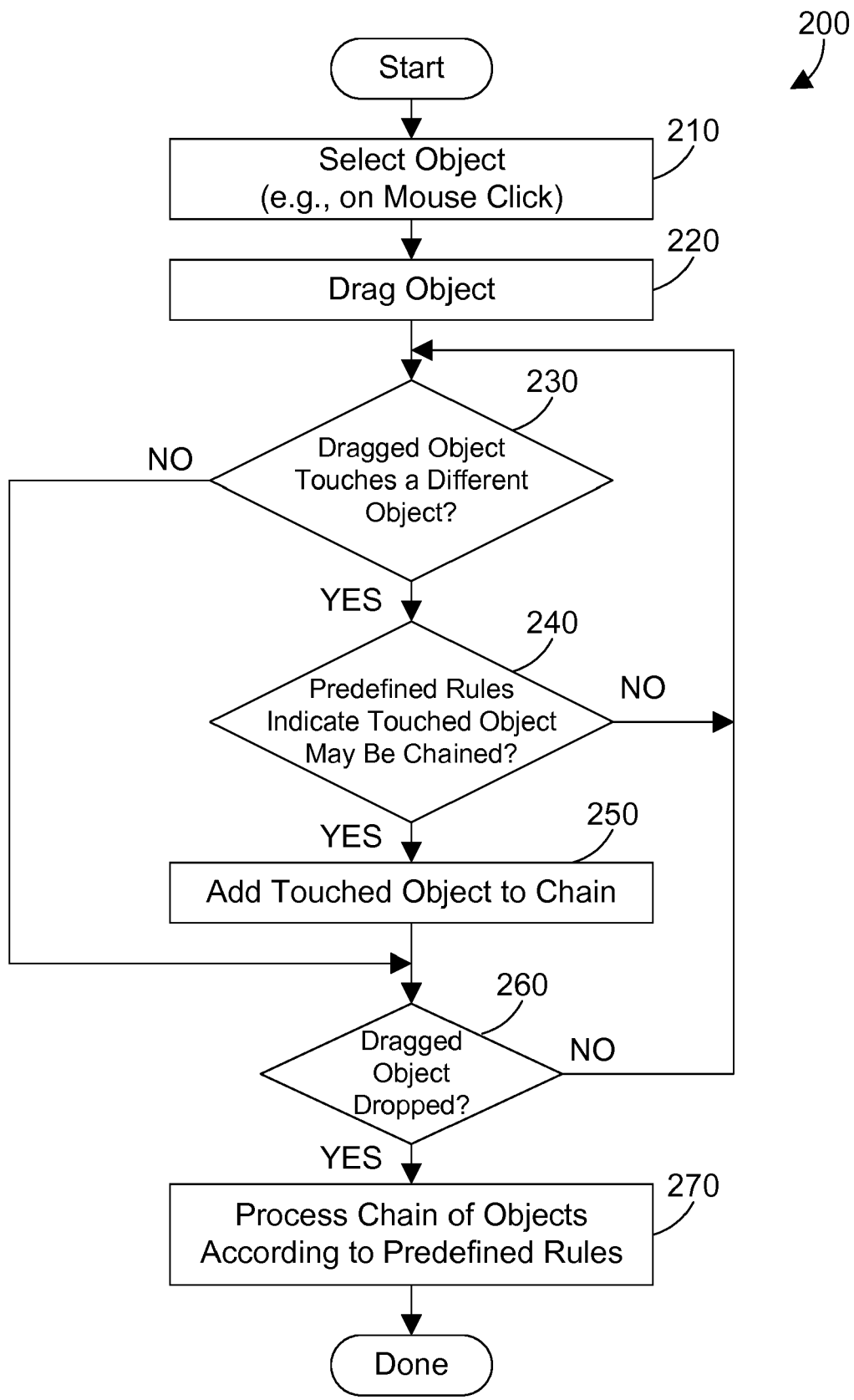
FIG. 2 is a flow diagram of a method for performing pointer drag path chaining operations in accordance with the preferred embodiments.

Referring to FIG. 2, method 200 begins by selecting an object in a graphical user interface (step 210). One suitable example for selecting an object is to place a mouse pointer on the object and click a mouse button to select the object. The object, once selected, may be dragged (step 220). If the dragged object touches a different object (step 230=YES), and if the predefined rules (i.e., rules 126 in FIG. 1) indicate the touched object may be chained (step 240=YES), the touched object is added to the chain (step 250). If the dragged object is not dropped (step 260=NO), method 200 loops back to step 230 and continues, potentially adding many touched objects to the chain. Once the dragged object is dropped (step 260=YES), the chain of objects is processed according to the predefined rules (step 270). These predefined rules are preferably included in the rules 126 shown in FIG. 1.

The preferred embodiments expressly extend to the chaining of GUI objects as well as the chaining of different objects that correspond to GUI objects. In the case of chaining different objects, an object in the GUI that may be touched by a dragged object has a corresponding object that may be added to the chain of objects. Thus, in the most preferred implementation, the chain of objects is a chain of objects that correspond to GUI objects instead of a chain of GUI objects themselves. The objects in the chain that correspond to GUI objects may simply indicate whether the object is an operand or an operator, and the type of operand or operator.

Note that the discussion herein is couched in terms of "operators" and "operands". An operator is broadly defined herein to mean anything that can perform a function of any kind on some operand. An operand is broadly defined herein to mean anything that can be acted upon by some operator. A simple mathematical example is 2+3. The numbers 2 and 3 are operands, and the addition sign is the operator. A simple logical example is A OR B. The items A and B are operands, and the OR is the operator that performs a logical "or" function of operands A and B. One skilled in the art will realize that the preferred embodiments extend to any and all operands and any and all operators, whether currently known or developed in the future.

The objects being touched by a selected object may include a defined region that must be contacted by the dragged object or pointer to add the object to the chain of objects. This defined region may be the outline of the graphical icon for the object in the graphical user interface, or may be some region that is larger or smaller that the graphical icon for the object. In addition, the defined region may have any suitable shape, including shapes related to the shape of the icon and other unrelated shapes as well.

In the alternative, a selected object that is being dragged must come within a defined proximity of an object to "touch" the object. This is alternative way to define a region which must be contacted by the object being dragged or by the pointer in order for the object being dragged to be added to the chain of objects. For example, the region could be defined by the outline of the icon of the object being dragged across, plus some defined space around the icon. In the alternative, the region could be defined in simple Cartesian coordinates. Note that the defined region may be smaller than the icon, the same size as the icon, or larger than the icon. Note that a first object is in a drag path of a selected object if any defined region corresponding to the selected object or the pointer touches any defined region corresponding to the first object during the dragging of the selected object.

When an object is being dragged, the pointer may show the outline of the object being dragged, or may show the pointer with some visual indication that a drag operation is occurring. Displaying the pointer instead of the dragged object is especially useful when the objects in the GUI are relatively large, which would making navigating around with a dragged object difficult without inadvertently touching objects the user did not intend to touch.

Figure 3:
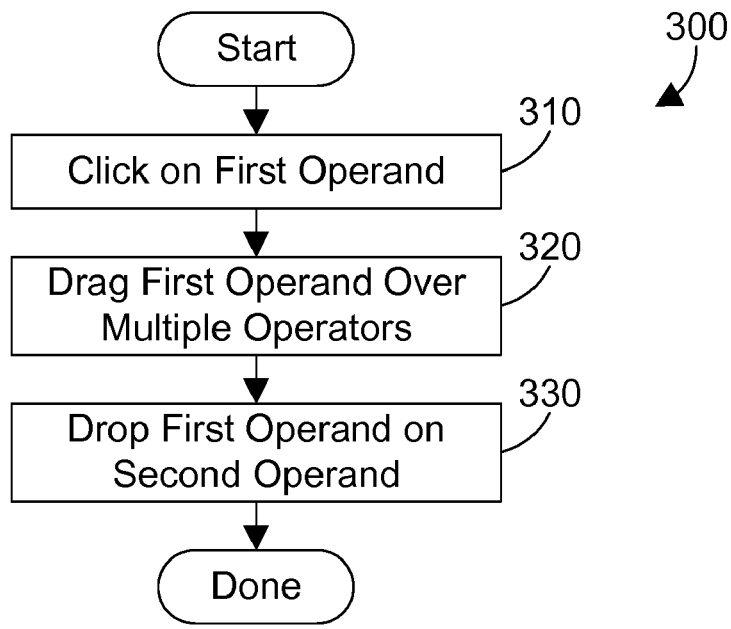
FIG. 3 is a flow diagram of a method for a user of a graphical user interface to perform chaining of objects in accordance with the preferred embodiments.
Figure 4:
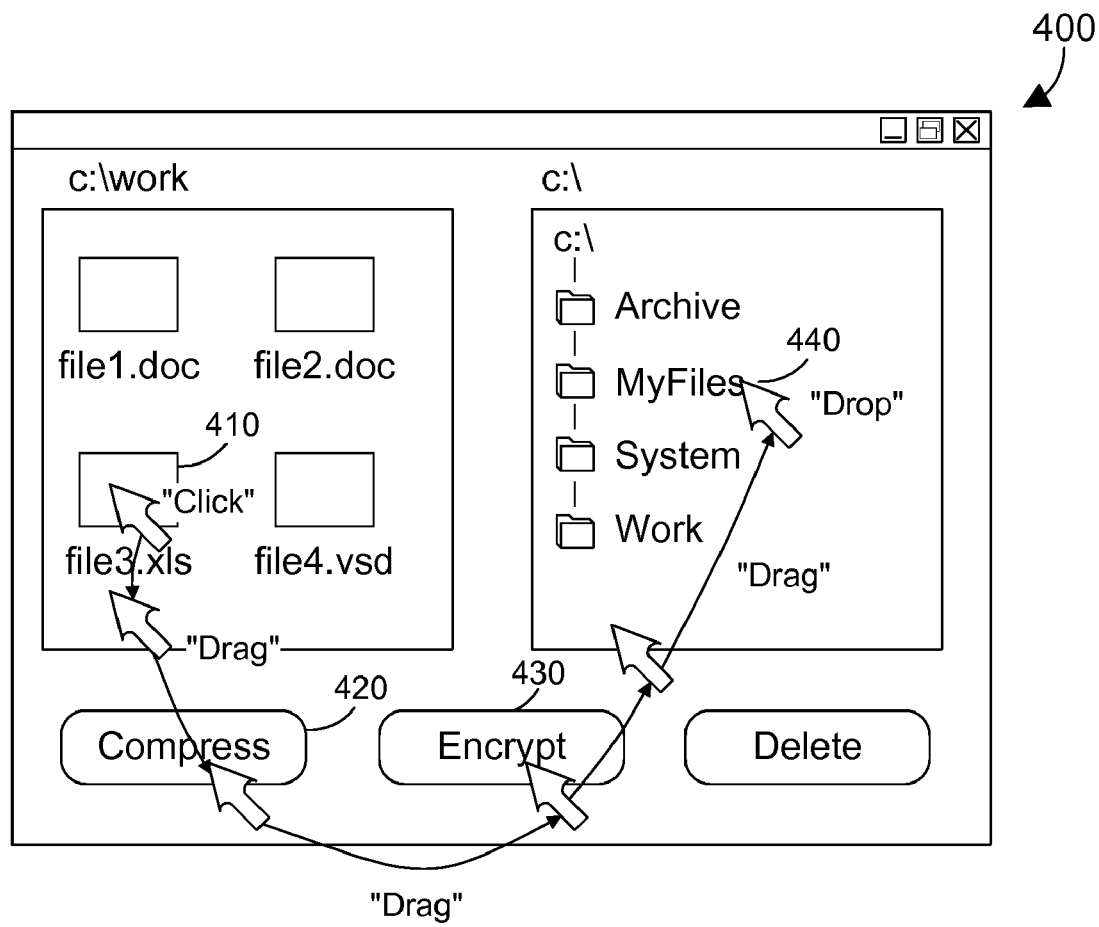
FIG. 4 is a diagram of a sample GUI window illustrating the methods shown in FIGS. 2 and 3.

In the preferred embodiments, multiple operands may be operated upon by multiple operators by chaining both operands and operators together in the chain of objects. One way for the pointer drag path chaining mechanism to function is shown in FIGS. 3-4. Referring to method 300 in FIG. 3, a first operand is clicked (step 310), the first operand is then dragged over multiple operators (step 320), and dropped on a second operand (step 330). As the object representing the first operand touches the objects corresponding to the operators in step 320, the pointer drag path chaining mechanism adds objects corresponding to each touched objects to the chain of objects (125 in FIG. 1).

One example of the function of method 300 in FIG. 3 is shown in window 400 in FIG. 4. The user clicks on the object "file3.xls" 410, drags the object 410 across the Compress button 420, continues to drag the object 410 across the Encrypt button 430, and drops the object 410 on the MyFiles folder 440. By selecting the file3.xls file, an object corresponding to the file3.xls file is added to a chain of objects. As the object 410 is dragged to touch the buttons 420 and 430 and the MyFiles folder 440, the pointer drag path chaining mechanism adds objects corresponding to these touched objects to the chain of objects. When the object 410 is dropped, the pointer drag path chaining mechanism processes all of the objects in the chain as an atomic group of operations.

Figures 10, 11, 12:
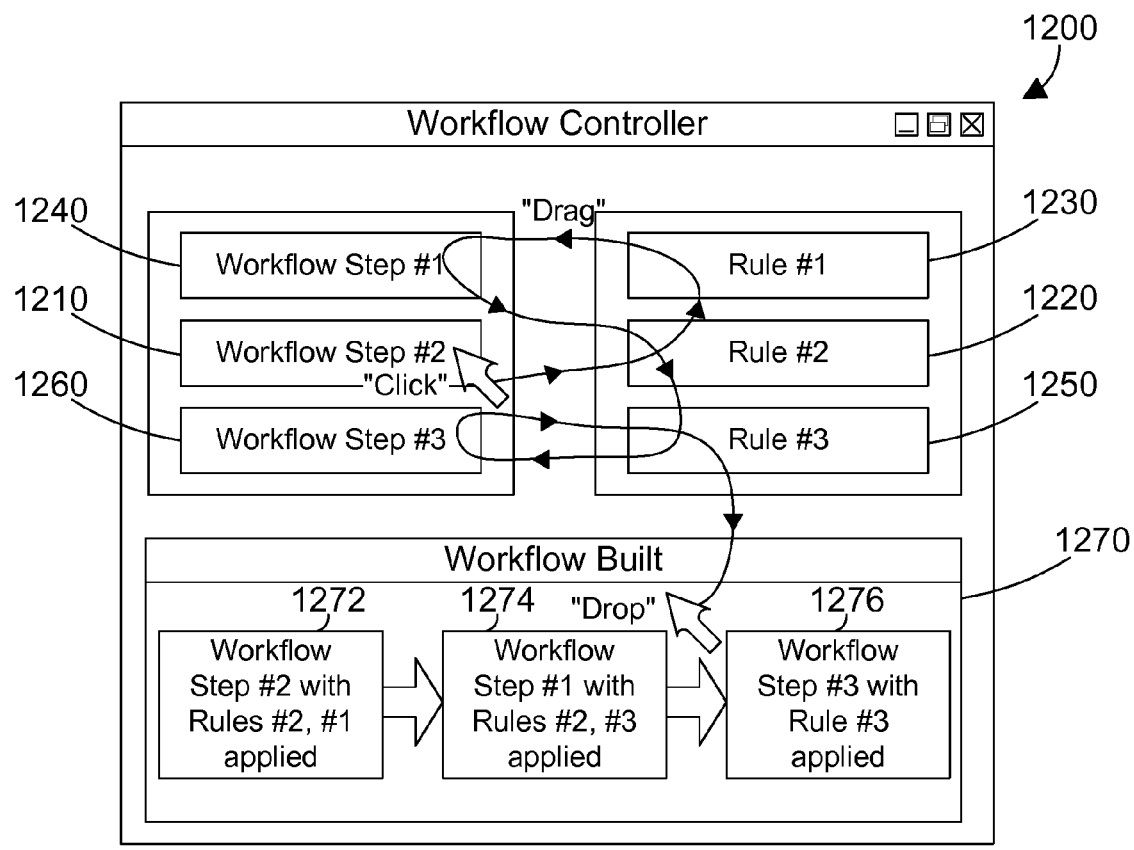
FIG. 10 shows the resulting atomic group of operations represented by the objects in FIG. 9.
FIG. 11 is a table of rules that govern the function of a pointer drag path chaining mechanism for a second example in accordance with the preferred embodiments.
FIG. 12 is a diagram of a sample GUI window illustrating the method shown in FIG. 2 in accordance with the rules shown in FIG. 11.

An example now follows to show the function of the pointer drag path chaining mechanism of the preferred embodiments for the specific example shown in FIGS. 3 and 4. Referring to FIG. 5, a table is shown with chaining rules that determine whether a touched object may be chained (i.e., added to the chain of objects). There are three chaining rules in the table in FIG. 5, namely: 1) the Compress, Encrypt or Delete objects may be chained to a dragged file object; 2) a location object may be chained to a dragged file object; and 3) a location object may be chained to the Compress, Encrypt or Delete objects. We now apply these rules to determine whether a touched object is added to the chain for the example in FIG. 4. First, the file3.xls object is selected, which results in an object corresponding to the file3.xls object being added to the chain of objects (which was previously empty). As a result, after selecting the file3.xls file, the chain of objects 125 contains a single object 610 corresponding to the file3.xls object, as shown in FIG. 6. Once the dragged file3.xls object touches the Compress button 420 in FIG. 4, we determine from Rule #1 in FIG. 5 that the Compress object may be chained to a dragged file object, so an object 620 corresponding to the Compress button is added to the chain of objects 125, as shown in FIG. 7. When the dragged file3.xls object then touches the Encrypt button 430, we determine again from Rule #1 in FIG. 5 that the Encrypt object may be chained to a dragged file object, so object 630 corresponding to the Encrypt button is added to the chain of objects 125, as shown in FIG. 8. When the dragged file3.xls object then touches the MyFiles object 440 in FIG. 4, we determine from Rule #2 that the MyFiles location object 440 may be chained to the dragged MyFiles object 440, so object 640 corresponding to the MyFiles object 440 is added to the chain of objects 125, as shown in FIG. 9. We assume that the selected file3.xls object is dropped on the MyFiles object 440 in FIG. 4. The "dropping" of an object is a well-known term in the GUI art, which simply means that the selected object file3.xls is deselected. As a result of deselecting the file3.xls object (by dropping the file3.xls object 410 onto the MyFiles object 440 in FIG. 4), the pointer drag path chaining mechanism knows to process the chain of objects 125 in FIG. 9 as an atomic group of operations. One possible representation of this atomic group of operations is shown in FIG. 10. One advantage of chaining objects into an atomic group of operations is that all of the operations in the group may be monitored as they are performed, which allows all of the operations in the group to be rolled back should any of the operations in the group fail. Thus, if the compression of file3.xls succeeds, but the encryption of file3.xls fails, the pointer drag path chaining mechanism can uncompress the file to return it to its original state.

Another example that shows the function of the pointer drag path chaining mechanism is shown in FIGS. 11-20. This specific example is a workflow controller that allows a user to construct workflows that represent real-world processes. FIG. 11 shows a table with chaining rules for the graphical user interface shown in FIG. 12. These three rules state: A) a workflow step must be selected first; B) a rule is applied to the last selected workflow step; and C) when a workflow step follows a rule step, the previous workflow step ends and a new workflow step is begun. Note that these chaining rules have letter designators instead of numbers to avoid confusing these rules with rules 1, 2 and 3 shown in FIG. 12.

We assume for this example that the user initially clicks the pointer on the object 1210 labeled Workflow Step #2 in FIG. 12. The user then drags the selected object 1210 over Rule #2 1220 and Rule #3 1230, over Workflow Step #1 1240, over Rule #2 1220 and Rule #3 1250, over Workflow Step #3 1260, over Rule #3 1250, then drops the selected object 1210 into the Workflow Built window 1270. Because there are multiple operands and multiple operators, the pointer drag path chaining mechanism needs to consult rules to determine whether an object may be chained when the object is touched in the drag path of the selected object. The rules A, B and C in FIG. 11 are applied to the GUI 1200 shown in FIG. 12.

Figure 13:
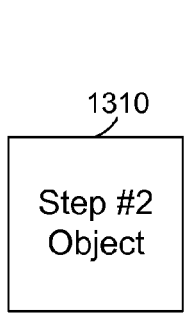
FIG. 13 is a diagram of a chain of objects in accordance with the preferred embodiments immediately after selecting the Workflow Step #2 button 1210 in FIG. 12.
Figure 14:
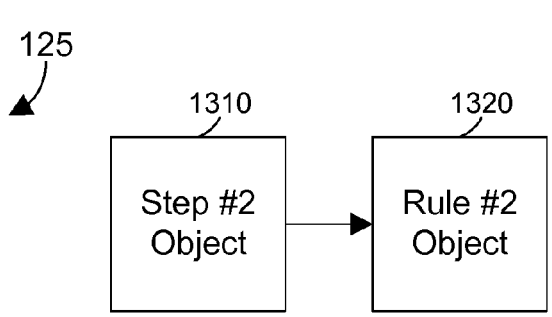
FIG. 14 is a diagram of the chain of objects in FIG. 13 after the dragged object in FIG. 12 touches the Rule #2 button 1220.
Figure 15:
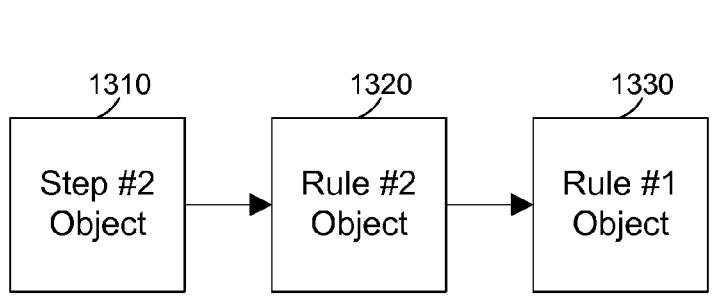
FIG. 15 is a diagram of the chain of objects in FIG. 14 after the dragged object in FIG. 12 touches the Rule #1 button 1230.
Figure 16:
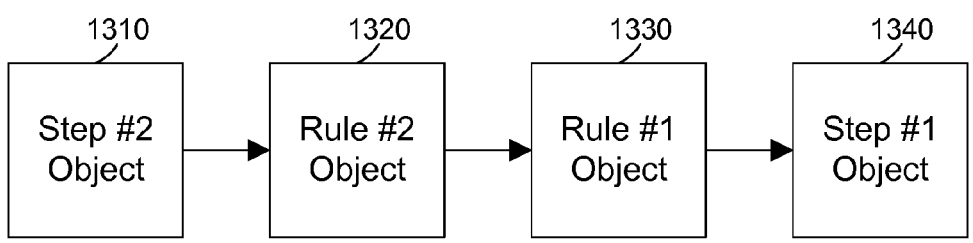
FIG. 16 is a diagram of the chain of objects in FIG. 15 after the dragged object in FIG. 12 touches the Workflow Step #1 button 1240.
Figure 17:
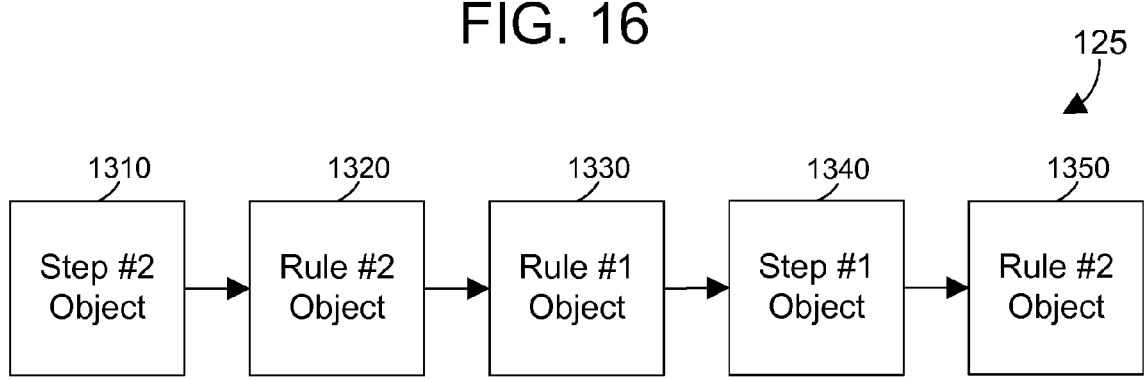
FIG. 17 is a diagram of the chain of objects in FIG. 16 after the dragged object in FIG. 12 touches the Rule #2 button 1250.
Figure 18:
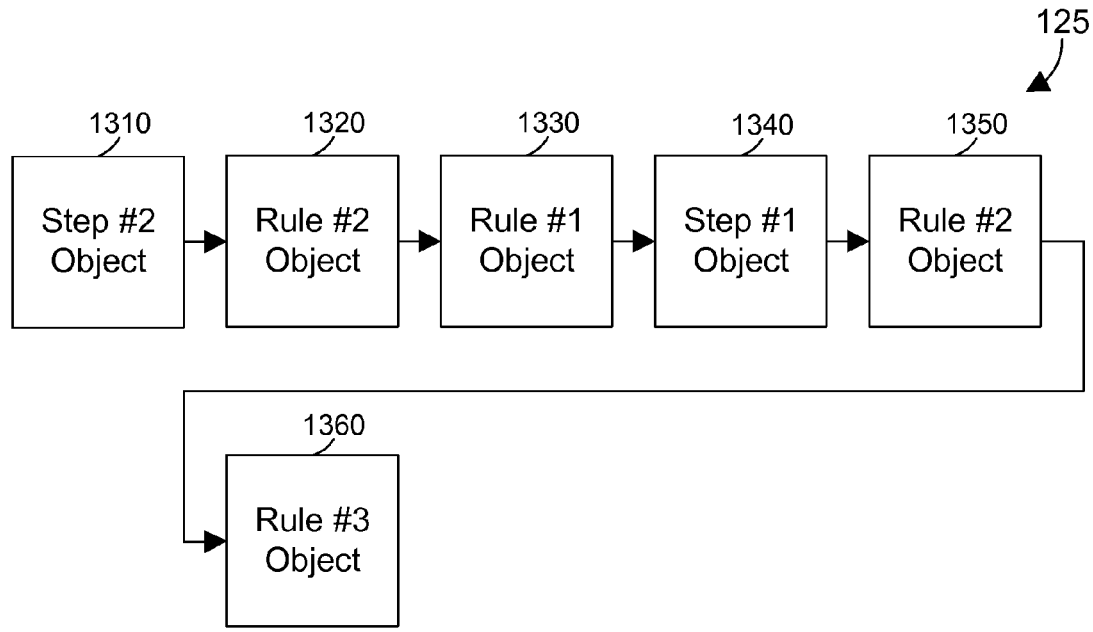
FIG. 18 is a diagram of the chain of objects in FIG. 17 after the dragged object in FIG. 12 touches the Rule #3 button 1250.
Figure 19:
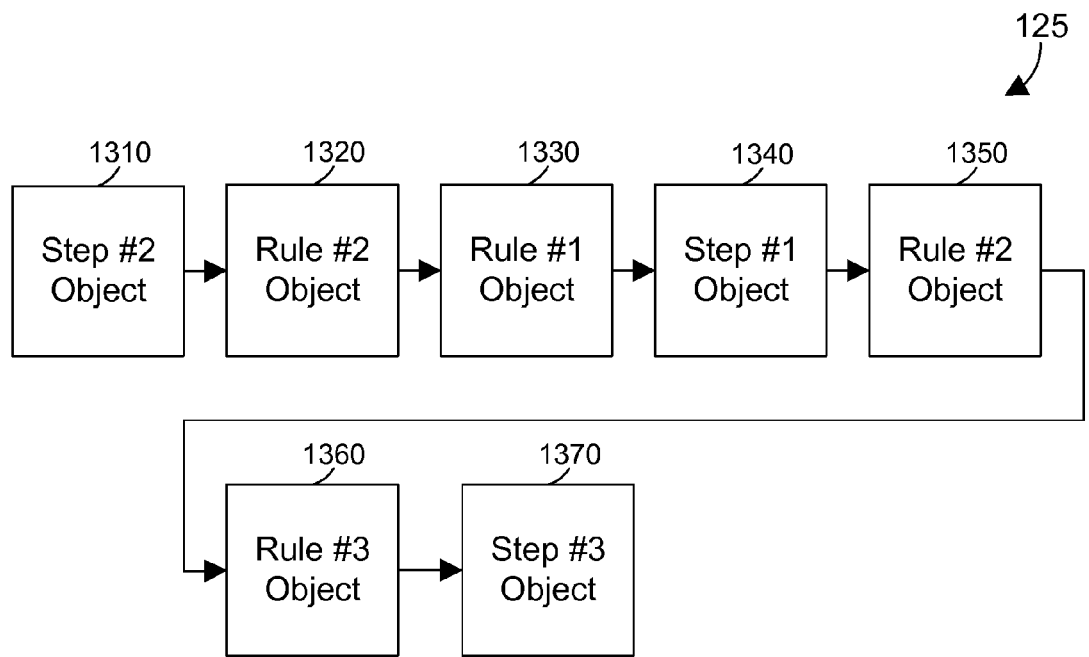
FIG. 19 is a diagram of the chain of objects in FIG. 18 after the dragged object in FIG. 12 touches the Workflow Step #3 button 1260.
Figure 20:
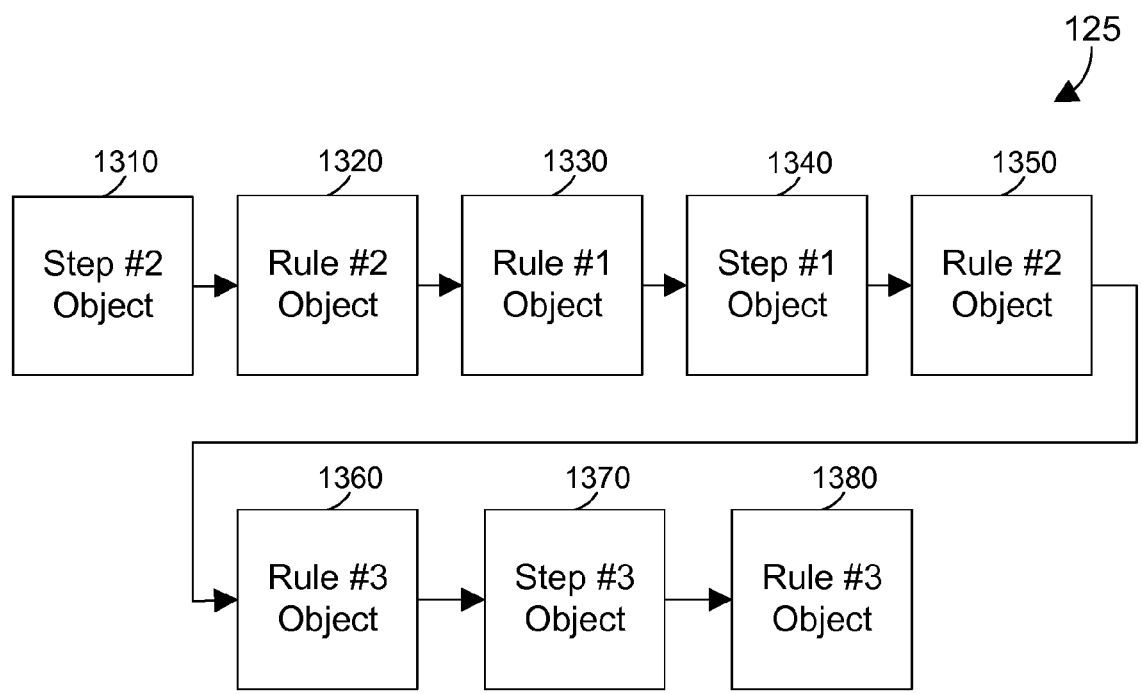
FIG. 20 is a diagram of the chain of objects in FIG. 19 after the dragged object in FIG. 12 touches the Rule #3 button 1250.

The drag path begins by selecting Workflow Step #2 1210. We see from Rule A in FIG. 11 that a workflow step must be selected first. The selection of workflow step 1210 causes a corresponding object 1310 to be added to the chain of objects 125 (which was previously empty), resulting in the chain of objects 125 containing a single object 1310 corresponding to the workflow step 1210, as shown in FIG. 13. When the selected object 1210 is dragged to touch the Rule #2 object 1220 in FIG. 12, the chaining rules in FIG. 11 are consulted to determine whether the Rule #2 object may be chained to the workflow step 1210. Rule B states that rules are applied to the last selected workflow step, which means the Rule #2 object may be chained to the workflow object 1210, so an object 1320 corresponding to the Rule #2 object 1220 is added to the chain of objects 125, as shown in FIG. 14. When the selected object 1210 is dragged to touch the Rule #1 object 1230, the chaining rules in FIG. 1 are consulted, where rule B indicates that Rule #1 should be applied to the last selected workflow step, namely workflow step 1210. As a result, an object 1330 corresponding to the Rule #1 object 1230 in FIG. 12 is added to the chain of objects 125, as shown in FIG. 15. Next, the drag path touches the Workflow Step #1 object 1240. The chaining rules in FIG. 1 are consulted, which indicate in rule C that going from a rule to a workflow step ends the previous workflow step and begins a new workflow step. As a result, an object 1340 corresponding to the Workflow Step #1 object 1240 is added to the chain of objects 125, as shown in FIG. 16. Now the drag path of the selected object touches the Rule #2 object 1220 again. Because Rule B in FIG. 1 allows a rule to follow a workflow step, an object 1350 corresponding to the Rule #2 object 1220 is added to the chain of objects 125, as shown in FIG. 17. Next, the drag path of the selected object touches the Rule #3 object 1250. Rule B in FIG. 1 allows adding an object 1360 corresponding to the Rule #3 object 1250 to be added to the chain of objects 125, as shown in FIG. 18. Next, the drag path of the selected object touches the Workflow Step #3 object 1260. Rule C in FIG. 1 states that this completes the previous workflow step and starts a new workflow step, so an object 1370 corresponding to the workflow step #3 1260 is added to the chain of objects 125, as shown in FIG. 19. The drag path of the selected object then touches the Rule #3 object 1250. Rule B states that this object may be chained, and applies to the last selected workflow step, so an object 1380 corresponding to the Rule #3 object 1250 is added to the chain of objects 125, as shown in FIG. 20. At this point, the selected object is dropped into the "Workflow Built" window 1270. The dropping (or deselecting) of the selected object tells the pointer drag path chaining mechanism 123 that the process of building the workflow is complete. This means the complete workflow is displayed in display window 1270 shown in FIG. 12.

Once the building of the workflow is complete, the workflow represented by the chain of objects 125 in FIG. 20 may be performed as an atomic group of operations. By chaining objects together in a drag path of a pointer, without requiring explicit mouse clicks, a user interface is provided that is much easier and more intuitive, and allows accomplishing complex tasks without clicking the pointer to select each object in the drag path. Thus, building this complex workflow with three distinct steps that have multiple rules applied is done by clicking a pointer once to select an object, dragging the selected object, then dropping the selected object. FIGS. 11-20 show one simple illustration of how powerful the preferred embodiments can be in significantly reducing the number of pointer clicks it takes to accomplish a task and increasing the ease of use of a graphical user interface, thereby increasing a user's efficiency.

There are many variations that could be applied to the exemplary embodiments discussed herein. For example, while the preferred embodiments discuss selecting a single object, then dragging the single object, multiple objects could be initially selected and dragged together. Thus, in window 400 in FIG. 4, if the user clicked on file1.doc, then on file2.doc, then on file3.xls, these could be selected as a group and dragged to the Compress button 420, which would result in all three of these files being compressed. In another variation, a user may need a way to cancel an operation after an object is selected and dragging has begun. One way to provide a cancel operation is to provide a "cancel" button within the GUI window. Another way to provide a cancel operation is to cancel any drag operation that is dropped outside of the current window.

In another variation, what does a user do if the user accidentally touches an object he or she did not intend to touch? Because the pointer drag path chaining mechanism chains an object that is touched (if the rules allow), there needs to be a way for the user to get rid of the last object that was added to the chain if the user makes a mistake. One way to do this is to provide an object such as a "back" button within the GUI window that removes the last object that was dragged across. Another way is to specify that only one operator may be active, and that the selection of a second operator object following a first operator object in the drag path is intended to cancel the selection of the first operator object.

Another variation greys out objects that are not valid selections. Thus, in window 1200 in FIG. 12, because a workflow step must be selected first (see rule A in FIG. 11), the Rule objects 1230, 1220 and 1250 could be initially greyed out, thereby preventing a user from selecting a rule before selecting a workflow step. This concept of greying out items in a GUI that should not or cannot be selected is known in the art, and extends the functionality of the preferred embodiments. The term "grey out" is used herein in a broad sense to mean any suitable way of disabling an object in the GUI from user selection, including the masking or hiding of the object from the user's view.

In another variation, status of the drag path could be displayed to the user as the user is dragging an item. There are many different ways to display such status information to a user. One way is to attach a small icon to the object being dragged or to the pointer to indicate the objects in the chain of objects. Another way is to provide a small status window that shows the selected object and the objects or attributes that have been picked up so far. This status window could be placed in a fixed location in the window, or could move to follow the pointer as it follows the drag path. Yet another way is to dynamically build a path in a separate window. For example, the workflow in the workflow window 1270 in FIG. 12 could be displayed to the user during the drag operation. Thus, as soon as the drag path contacts the Workflow Step #1 1240, the workflow step 1272 could be displayed to the user with the two rules that were touched. In the alternative, the workflow step 1272 could be displayed as soon as the Workflow Step #2 1210 is selected, and the rules 1220 and 1230 could then be added to the display as soon as they are touched in the drag path.

One suitable implementation of the preferred embodiments uses the concept of "listeners". The general concept of listeners for GUI objects is well-known in the art. A "select listener" for an object detects when a mouse button is pressed when the pointer is on the object. A "drop listener" for an object detects when a mouse button is released when the pointer is on the object. The preferred embodiments define a new listener referred to herein as a "drag listener" for each GUI object. In one specific example, a drag listener, when it detects a drag operation that touches its corresponding object, triggers an operation that adds a corresponding object to the chain of objects. Of course, other implementations could also be used within the scope of the preferred embodiments, which extends to any and all implementations that fall within the scope of the disclosure and claims herein.

The preferred embodiment also gives rise to a new pointer event. Pointer pickup events and pointer drop events are known in the art. However, the preferred embodiments allow the defining of a new pointer event which we call a "pointer pickup event". This new event causes an object that is touched in the drag path of a selected object to be stored in the chain of objects.

The preferred embodiments provide a pointer drag path chaining mechanism that allows a user of a graphical user interface to select an object, thereby placing a corresponding object in a chain of objects, then adding one or more other objects to the chain of objects as other objects are touched in the drag path of the selected object. By chaining multiple objects together by simply touching those objects in the drag path of a selected object, the simple action of dragging an object to touch other objects results in performing multiple functions with a single mouse click that would normally take multiple mouse clicks using prior art GUIs.

Note that the preferred embodiments extend to dragging any object to touch a different object, even if the different object is in a different window in the graphical user interface, and even if the different object is in a window that corresponds to a different software application.

While the discussion above and claims herein are couched in terms of "chaining" objects together, one skilled in the art will realize that any suitable data structure could be used to group object together, including a linked list, a queue, etc. The term "chain" and "chaining" as used herein expressly extends to any and all data structures and methods of linking or grouping together objects in a drag path of a selected object.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
    at least one processor;
    a memory coupled to the at least one processor; and
    a pointer drag path chaining mechanism residing in the memory and executed by the at least one processor, the pointer drag path chaining mechanism comprising a pointer that allows selecting a first object in a graphical user interface, the selection of the first object causing the pointer drag path mechanism to place a first corresponding object in a chain of objects, wherein the pointer further allows dragging the selected first object to touch a second object, the touching of the second object causing the pointer drag path mechanism to place a second corresponding object in the chain of objects without a user of the pointer pressing any additional buttons on a pointing device that controls the pointer, wherein after the selected first object is deselected, the pointer drag path chaining mechanism processes the chain of objects as an atomic group of operations according to at least one operand and at least one operator in the chain of objects, thereby allowing rolling back any performed operations if any operation in the chain of objects fails.

2. The apparatus of claim 1 wherein the pointer drag path chaining mechanism adds objects to the chain of objects according to at least one predefined rule.

3. The apparatus of claim 1 further wherein the pointer drag path chaining mechanism processes the chain of objects according to at least one predefined rule.

4. The apparatus of claim 3 wherein the pointer drag path chaining mechanism processes the chain of objects when the selected first object is deselected.

5. The apparatus of claim 1 wherein the pointer further allows dragging the selected first object to touch a third object, the touching of the third object causing a third corresponding object to be placed in the chain of objects.

6. The apparatus of claim 5 wherein the first, second and third objects each represent an operator or an operand.

7. A computer-readable program product comprising software stored on non-transitory recordable media, the software comprising:
    a pointer drag path chaining mechanism comprising a pointer that allows selecting a first object in a graphical user interface, the selection of the first object causing the pointer drag path chaining mechanism to place a first corresponding object in a chain of objects, wherein the pointer further allows dragging the selected first object to touch a second object, the touching of the second object causing the pointer drag path chaining mechanism to place a second corresponding object in the chain of objects without a user of the pointer pressing any additional buttons on a pointing device that controls the pointer, wherein after the selected first object is deselected, the pointer drag path chaining mechanism processes the chain of objects as an atomic group of operations according to at least one operand and at least one operator in the chain of objects, thereby allowing rolling back any performed operations if any operation in the chain of objects fails.

8. The program product of claim 7 wherein the pointer drag path chaining mechanism adds objects to the chain of objects according to at least one predefined rule.

9. The program product of claim 7 wherein the pointer drag path chaining mechanism processes the chain of objects according to at least one predefined rule.

10. The program product of claim 9 wherein the pointer drag path chaining mechanism processes the chain of objects when the selected first object is deselected.

11. The program product of claim 7 wherein the pointer further allows dragging the selected first object to touch a third object, the touching of the third object causing a third corresponding object to be placed in the chain of objects.

12. The program product of claim 11 wherein the first, second and third objects each represent an operator or an operand.

13. A method for a user to perform a function using a graphical user interface, the method comprising the steps of:
    selecting a first object;
    as a result of selecting the first object, placing a first corresponding object in a chain of objects;
    dragging the selected first object to touch a second object;
    as a result of the selected first object touching the second object, placing a second corresponding object in the chain of objects without a user of the pointer pressing any additional buttons on a pointing device that controls the pointer; and
    after the selected first object is deselected, processing the chain of objects as an atomic group of operations according to at least one operand and at least one operator in the chain of objects, thereby allowing rolling back any performed operations if any operation in the chain of objects fails.

14. The method of claim 13 further comprising the step of adding objects to the chain of objects according to at least one predefined rule.

15. The method of claim 13 further comprising the step of processing the chain of objects according to at least one predefined rule.

16. The method of claim 15 wherein the at least one predefined rule specifies at least one type of object that may be chained to the first object.

17. The method of claim 13 further comprising the step of dragging the selected first object to touch a third object, the touching of the third object causing a third corresponding object to be placed in the chain of objects.

18. The method of claim 17 wherein the first, second and third objects each represent an operator or an operand.

19. A method for using a graphical user interface, the method comprising the steps of:
    generating a pointer pickup event in the graphical user interface by selecting a first object in the graphical user interface using the pointer, the pointer pickup event causing a first corresponding object to be stored in a chain of objects;

dragging the selected first object;

touching a second object in the graphical user interface with the selected first object while dragging the selected first object, thereby generating a pointer chain event in the graphical user interface that causes a second corresponding object to be stored in the chain of objects without a user of the pointer pressing any additional buttons on a pointing device that controls the pointer;

generating a pointer drop event in the graphical user interface by deselecting the first object in the graphical user interface; and after the pointer drop event occurs, processing the chain of objects as an atomic group of operations according to at least one operand and at least one operator in the chain of objects, thereby allowing rolling back any performed operations if any operation in the chain of objects fails.

20. A method for processing a chain of objects, the method comprising the steps of:

selecting a first object in a graphical user interface using a pointer, the first object comprising one of an operator and an operand;

dragging the first object, wherein a drag listener in the graphical user interface evaluates the proximity of the pointer to a second object and determines if the pointer is in proximity to the second object and if the second object qualifies to be chained to the first object according to at least one predefined rule that specifies at least one type of object that may be chained to the first object, wherein the second object comprises one of an operator and an operand;

chaining the second object to the first object if the pointer is in proximity to the second object and the second object qualifies to be chained to the first object according to the at least one predefined rule, thereby creating a chain of objects;

not chaining the second object to the first object if the second object does not qualify to be chained to the first object according to the at least one predefined rule;

dragging the selected first object to touch a third object, wherein the drag listener in the graphical user interface evaluates the proximity of the pointer to the third object and determines if the pointer is in proximity to the third object and if the third object qualifies to be chained to the chain of objects according to the at least one predefined rule, wherein the third object comprises one of an operator and an operand;

chaining the third object to the chain of objects if the pointer is in proximity to the third object and the third object qualifies to be chained to the chain of objects according to the at least one predefined rule;

not chaining the third object to the chain of objects if the third object does not qualify to be chained to the chain of objects according to the at least one predefined rule;

repeating the addition of objects to the chain of objects until the first object is deselected, wherein the chain of objects defines at least one operator and at least one operand; and processing the at least one operator and the at least one operand in the chain of objects as an atomic group of operations, thereby allowing rolling back all operations performed when processing the chain of objects if any operation in the chain of objects fails.

* * * * *